June 10, 1958     C. G. CRUZAN ET AL     2,838,731
ELECTRICAL WELL LOGGING
Filed July 31, 1953     3 Sheets-Sheet 1
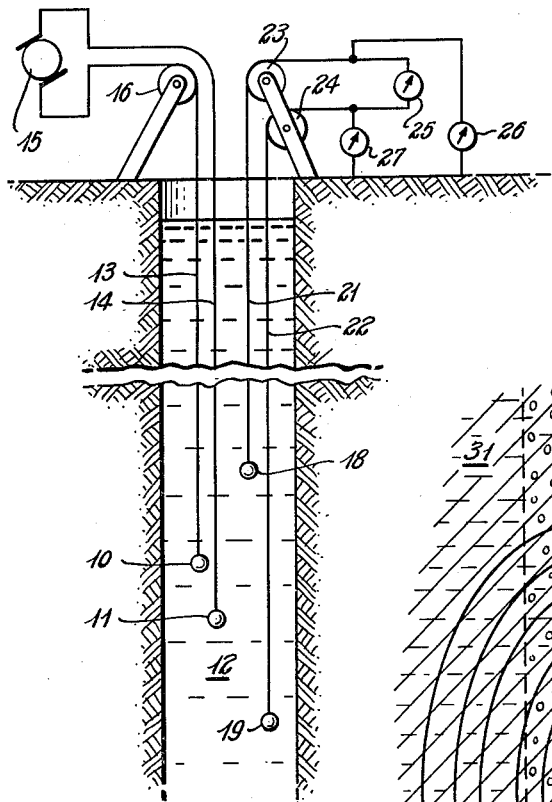
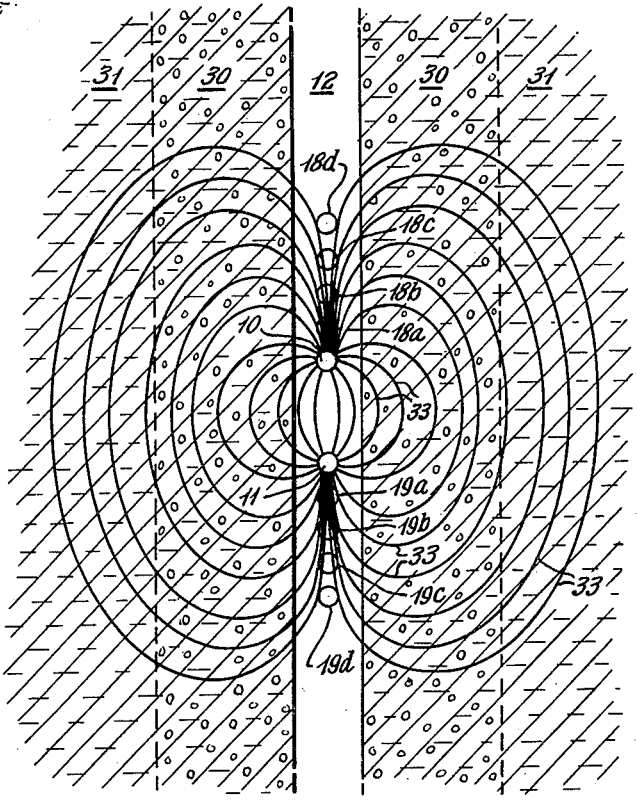
INVENTOR.
R. G. Piety and
BY C. G. Cruzan
Hudson & Young
ATTORNEYS

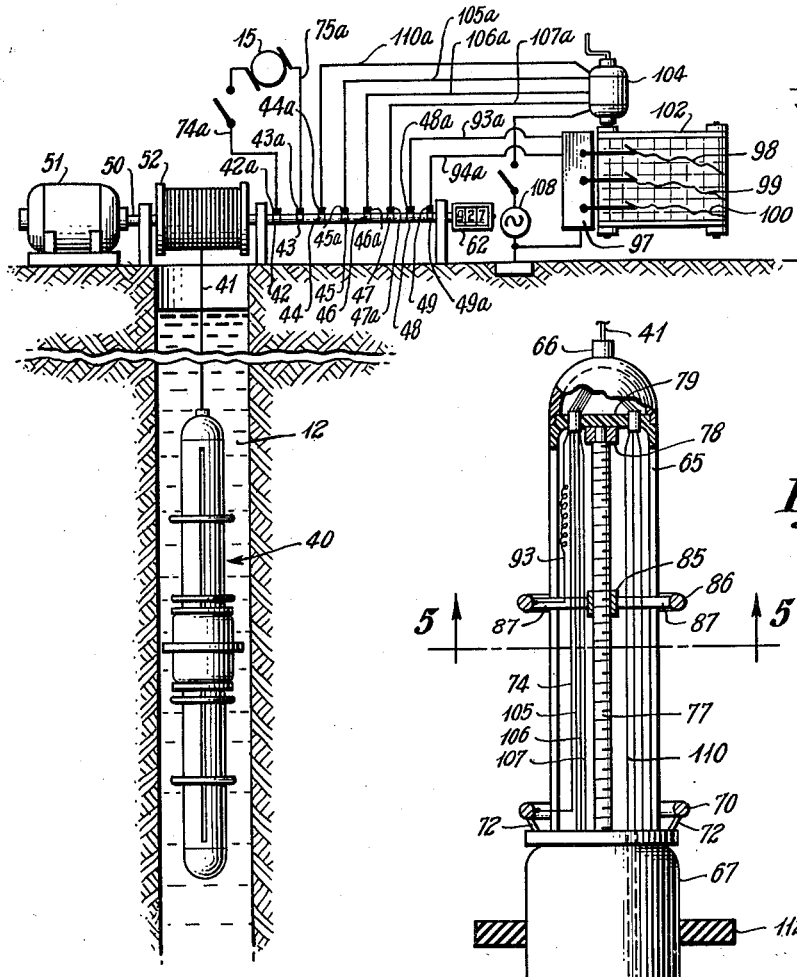

June 10, 1958   C. G. CRUZAN ET AL   2,838,731
ELECTRICAL WELL LOGGING
Filed July 31, 1953   3 Sheets-Sheet 3

INVENTOR.
R. G. Piety and
BY   C. G. Cruzan
Hudson & Young
ATTORNEYS

United States Patent Office 2,838,731
Patented June 10, 1958

2,838,731

ELECTRICAL WELL LOGGING

Charles G. Cruzan and Raymond G. Piety, Bartlesville, Okla., assignors to Phillips Petroleum Company, a corporation of Delaware Application July 31, 1953, Serial No. 371,633

17 Claims. (Cl. 324—1)

This invention relates to electrical well logging. In one aspect it relates to a method of and apparatus for determining the depth of fluid invasion into penetrated formations adjacent bore holes.

At the present time most deep penetration resistivity well logging is practiced by lowering a first current input electrode into a bore hole so as to be in electrical contact with the well fluid. The return path for current emitted from this current input electrode extends through the well fluid and the surrounding earth formations to a second current electrode positioned either at the earth surface or within the bore hole at a location remotely spaced from the first current input electrode. With such an electrode configuration the direction of current flow is substantially radially divergent in all directions from the current input electrode through the surrounding well fluid and earth formations. This results in an infinite number of concentric spherical equipotential surfaces being established with the current input electrode as the center. A pair of potential pick-up electrodes also are lowered into the bore hole in electrical contact with the well fluid. These pick-up electrodes normally are positioned along the longitudinal axis of the bore hole in predetermined spaced relation with one another and with the current input electrode, the pick-up electrodes being either above or below the current input electrode. Potential differences which exist between the two spherical potential surfaces spaced from the current input electrode the same distance as the spacing between the respective pick-up electrodes and the current electrode are indicated by the measured potential differences between the pick-up electrodes, and from these potential measurements the resistivity of the surrounding formations can be calculated. The distance of the axial spacing between the pick-up electrodes and the current input electrode is equal to the lateral depth of penetration of the resistivity measurements being made.

Resistivity determinations thus made actually constitute the average resistivity of the well fluid and surrounding earth formation contained within the spherical shell of radius equal to the spacing between the pick-up electrodes and the current input electrode. Because of differences in resistivity of the well fluid and the adjacent formations, the spherical shell often is distorted such that the resulting resistivity determinations are only approximations. Consequently, the well logging methods practiced heretofore have not been capable of providing accurate information regarding the lateral depth of discontinuities in the electrical characteristics of the surrounding formations. These discontinuities are often caused by invasion of well fluids into porous formations.

In accordance with the present invention an improved well logging system is provided for making resistivity determinations of surrounding earth formations and for determining the lateral depth of electrical discontinuities in such formations.

Accordingly, it is an object of this invention to provide a method of and apparatus for determining the lateral depth of electrical discontinuities in earth formations surrounding well bore holes.

Another object is to provide a method of and apparatus for determining the depth of well fluid invasion into surrounding porous earth formations.

A further object is to provide improved methods of an apparatus for making resistivity measurements in well bore holes.

The invention comprises, generally, positioning a pair of current electrodes in a bore hole in closely spaced relation along the longitudinal axis of the bore hole and applying a source of electrical energy between the two electrodes. A pair of potential pick-up electrodes are positioned in bore hole along the longitudinal axis thereof such that one pick-up electrode is above the current electrodes and the other pick-up electrode is below the current electrodes. The two pick-up electrodes are moved together both inwardly or both outwardly with respect to the pair of current electrodes, and the potential difference between the pick-up electrodes is recorded as a function of the separation from the current electrodes, the depth the entire assembly is lowered into the bore hole being noted. Whenever the electrode assembly is located in a medium that is homogeneous with respect to electrical properties, the total current flow between the two current electrodes forms a symmetrical pattern whereby the recorded potential differences form a smooth curve when plotted against electrode separation. Any abrupt discontinuities in the surrounding formations, such as the dividing line of total well fluid invasion, result in a corresponding break in the plotted curve. Several novel embodiments of apparatus are provided for making these measurements within a bore hole.

Various other objects, advantages and features of this invention should readily become apparent from the following detailed description taken in conjunction with the accompanying drawing in which:

Figure 1 is a schematic view of the electrode assembly in operative position within a bore hole;

Figure 2 is a schematic view of the cross-section of the bore hole and the current flow paths through the surrounding earth formations;

Figure 3 is an elevation view of one embodiment of the electrode assembly and the associated surface equipment;

Figure 4 is a detailed view, shown partially in section, of the electrode assembly of Figure 3;

Figure 5 is a sectional view taken along line 5—5 in Figure 4;

Figure 6:
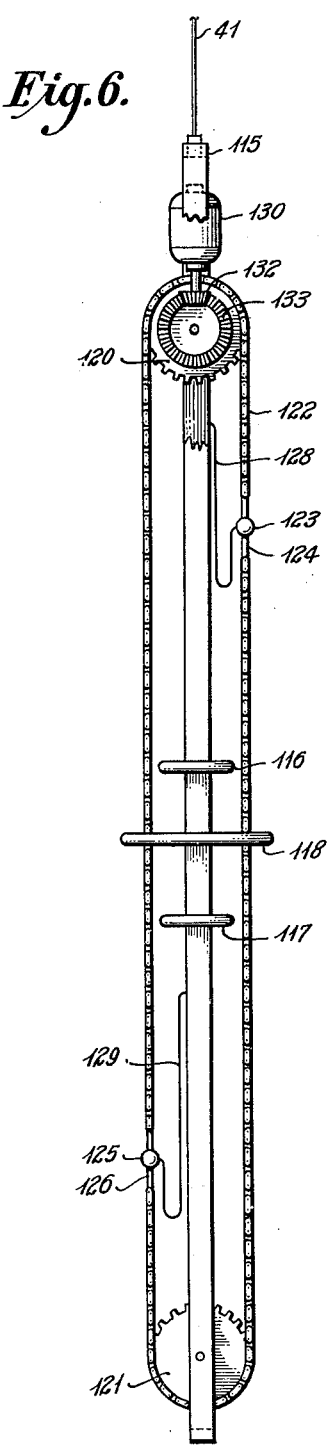
Figure 6 illustrates a second embodiment of the electrode assembly.

Referring now to the drawing in detail and to Figure 1 in particular, there is illustrated a pair of current electrodes 10 and 11 which are suspended in a well bore hole 12 by respective insulated conductors 13 and 14. Conductors 13 and 14 are connected at their upper ends to the respective terminals of a current source 15, which preferably supplies alternating current. Electrodes 10 and 11 are in electrical contact with the well fluid in bore hole 12 whereby a current path is completed between these electrodes through the well fluid and the surrounding earth formations. The alternating current source is preferred because it prevents polarization of the electrodes, although the principles of operation of the logging system of this invention in no way limit source 15 to alternating current. Direct current, either steady or pulsating, can be employed if desired. Conductors 13 and 14 are shown as being suspended from a common pulley 16 whereby electrodes 10 and 11 are maintained in spaced relation with one another, preferably along the longitudinal axis of the bore hole. A pair of potential pick-up electrodes 18 and 19 are suspended in bore hole 12 by respective insulated conductors 21 and 22 which pass over respective pulleys 23 and 24. A voltmeter 25 is connected across conductors 21 and 22 and voltmeters 26 and 27 are connected between respective conductors 21 and 22 and a point of reference potential, such as ground. Electrodes 18 and 19 which also are in electrical contact with the well fluid, are positioned such that electrode 18 is above electrodes 10 and 11 and electrode 19 is below electrodes 10 and 11.

In Figure 2 there is shown a section of bore hole 12 drilled through a porous formation wherein well fluid has invaded the formation in the region indicated by 30. The non-invaded portion 31 of the formation surrounds invaded region 30. Current electrodes 10 and 11 are positioned in spaced relation along the longitudinal axis of bore hole 12 whereby current flows between the two electrodes along a plurality of paths designated schematically by lines 33. These current flow paths represent a somewhat idealized configuration in which the electrical resistivities of the well fluid in bore hole 12, the invaded zone 30 and the non-invaded zone 31 are substantially equal. Reference characters 18a and 19a designate first respective positions of potential pick-up electrodes 18 and 19. At this first position electrode 18 is as far above electrode 10 as electrode 19 is below electrode 11. Reference characters 18b and 19b, 18c and 19c and 18d and 19d designate second, third and fourth corresponding respective positions of potential pick-up electrodes 18 and 19. If the resistivities of the well fluid, zone 30 and zone 31 are equal, the potential differences between electrodes 18 and 19 at the a, b, c and d positions lie along a smooth curve when plotted against the distance pick-up electrodes 18 and 19 are separated.

However, in actual practice the resistivities of the well fluid, invaded zone 30 and non-invaded zone 31 often differ considerably. This results in a disturbance of the illustrated idealized current flow paths because the current flow tends to follow the path of least resistance between electrodes 10 and 11. It can be seen from an inspection of Figure 2 that the electrode positions c and d lie along current flow paths which penetrate non-invaded zone 31, whereas electrode positions a and b are influenced by additional current flow through the invaded zone 30. If non-invaded zone 31 has an electrical resistivity which differs from the resistivity of invaded zone 30, the potential difference measurements between electrodes 18 and 19 at the several positions a, b, c and d are different from the corresponding measurements in a homogeneous medium. In particular, if the measured potential differences are plotted against the electrode spacing as previously described, a break in the curve occurs at a position which is representative of the depth of fluid invasion into the surrounding formations. As long as the electrode assembly is positioned within a relatively thick bed the average potential at electrode 18 (assuming current source 15 provides alternating current) is identical to the average potential at electrode 19 at any of the illustrated positions a, b, c and d. However, if the electrode assembly is positioned adjacent the boundary between two generally horizontal zones of different resistivity, the average potentials at electrodes 18 and 19 differ from one another. This provides an indication of the boundary location. These latter potential measurements at electrodes 18 and 19 are obtained from meters 26 and 27 which are connected between respective electrodes 18 and 19 and ground. Valuable information is therefore obtained from the logging system of this invention by positioning current electrodes 10 and 11 at a preselected depth in the well bore hole and moving potential pick-up electrodes 18 and 19 inwardly and outwardly together with respect to current electrodes 10 and 11. The potential difference between electrodes 18 and 19 is measured as a function of the electrode spacing and the depth the entire assembly is lowered in the bore hole. Additional information is obtained by measuring the potential at either or both of the pick-up electrodes with respect to a point of reference potential.

In Figures 3, 4 and 5 there is shown a first embodiment of apparatus which is adapted to provide the information required in accordance with the novel logging procedure of this invention. As therein illustrated an electrode housing assembly 40 is suspended in bore hole 12 by a cable 41 which contains a plurality of electrical conductors, the upper ends of which terminate in respective slip rings 42, 43, 44, 45, 46, 47, 48 and 49 mounted on the drive shaft 50 of a motor 51 which rotates a reel 52 to raise and lower assembly 40. Electrical brushes 42a, 43a, 44a, 45a, 46a, 47a, 48a and 49a engage respective slip rings 42, 43, 44, 45, 46, 47, 48 and 49. An odometer 62 is connected to shaft 50 to indicate the depth to which assembly 40 is lowered.

Electrode housing assembly 40 comprises a first elongated hollow casing 65 which is secured at its upper end to cable 41 by a cable clamp 66. An electric motor 67 is attached to the lower end of casing 65 and a second elongated hollow casing 68 is in turn suspended from motor 67. Annular current electrodes 70 and 71, which correspond to respective electrodes 10 and 11 in Figure 1, are attached to the upper and lower ends of motor 67 by respective insulating supports 72 and 73. Conductors 74 and 75 are attached to respective electrodes 70 and 71 and extend upwardly therefrom through cable 41 to respective slip rings 42 and 43. Current source 15 is connected between brushes 42a and 43a by leads 74a and 75a. Motor 67 is supplied with a first threaded drive shaft 77 which extends upwardly through casing 65 to a bearing support 78 which is secured to a plate 79, the latter extending across the upper portion of casing 65. A second threaded drive shaft 81 extends downwardly from motor 67 through casing 68 to a second bearing support 82 which is secured to a plate 83, the latter extending across the lower portion of casing 68. A threaded collar 85 is fitted about drive shaft 77 and a first annular pick-up electrode 86, which corresponds to electrode 18 of Figure 1, is positioned about housing 65 and attached to collar 85 by a pair of insulating supports 87. Supports 87 extend through respective vertical slots formed in casing 65. A second threaded collar 89 is fitted about drive shaft 81 and a second annular pick-up electrode 90, which corresponds to electrode 19 of Figure 1, is positioned about casing 68 and attached to collar 89 by a pair of insulating supports 91. Supports 91 extend through respective vertical slots formed in housing 68.

It should be noted that drive shafts 77 and 81 are provided with threads of opposite direction such that rotation of motor 67 in a first direction causes electrodes 86 and 90 to move outwardly together from respective electrodes 70 and 71 and rotation of motor 67 in the opposite direction causes electrodes 86 and 90 to move inwardly together toward respective electrodes 70 and 71. Flexible conductors 93 and 94 are attached to respective electrodes 86 and 90 and extend upwardly therefrom through cable 41 to respective slip rings 48 and 49. Conductors 93a and 94a extend between respective brushes 48a and 49a and a recording voltmeter assembly 97 which provides traces 98, 99 and 100 on a chart 102. Traces 98, 99 and 100 correspond to the respective measurements 25, 26 and 27 of Figure 1. Motor 67 preferably is a synchros-motor which is rotated by corresponding rotation of a synchros-generator 104 positioned at the surface. The coils of motor 67 and generator 104 are connected to one another by conductors 105, 106 and 107 which extend between motor 67 and respective slip rings 45, 46 and 47 through cable 41. Conductors 105a, 106a and 107a extend between respective brushes 45a, 46a and 47a and generator 104. Current for generator 104 and motor 67 is supplied by an alternating current voltage source 108 which preferably has one terminal thereof grounded and the other terminal connected to generator 104. A conductor 110a extends between generator 104 and brush 44a, and a conductor 110 extends from slip ring 44 to motor 67 through cable 41. Motor 67 also is provided with a grounded terminal, not shown, in contact with the well fluid. A disk of electrically insulating material 112 is positioned about motor 67. Disk 112 is of sufficient diameter to divert a large portion of the current flow between electrodes 70 and 71 through the surrounding earth formations rather than through the drilling mud surrounding the assembly.

The operation of the logging assembly of Figures 3, 4 and 5 should now become apparent. Assembly 40 is lowered into well 12 to the desired depth by rotation of reel 52, and current is applied between electrodes 70 and 71 from source 15. Generator 104 then is rotated either manually or by an auxiliary motor, not shown, to move electrodes 86 and 90 inwardly or outwardly with respect to electrodes 70 and 71. This movement of electrodes 86 and 90 is accompanied by a corresponding movement of chart 102 such that the potential curves 98, 99 and 100 correlate the measured potentials with the spacing between electrodes 86 and 90, this spacing being a function of the rotation of generator 104. In this manner potential measurements are made at the surface which are indicative of the conditions previously described in conjunction with Figure 2.

In Figure 6 there is illustrated a second embodiment of a logging assembly which is adapted to provide substantially the same information as obtained from the logging assembly of Figure 4. The apparatus of Figure 6 comprises generally an elongated housing assembly 115 which is attached at its upper end to cable 41. A pair of spaced annular electrodes 116 and 117 are attached to housing 115 near the midpoint thereof and a disc of electrically insulating material 118 is attached to housing 115 between electrodes 116 and 117. Electrodes 116 and 117 correspond to respective electrodes 70 and 71 of Figure 4 and are connected to current generator 15 at the surface by leads, not shown, which correspond to respective leads 74 and 75 of Figure 4. A first sprocket wheel 120 is secured to housing 115 near the upper end thereof and a second sprocket wheel 121 is secured to housing 115 near the lower end thereof. A continuous chain 122 extends about sprocket wheels 120 and 121. A first electrode 123 is attached at a first point on chain 122 by an electrically insulating support 124 and a second electrode 125 is attached at an opposite point on chain 122 by an electrically insulating support 126. Electrodes 123 and 125 are thereby positioned on chain 122 such that in any given position electrode 123 is as far above electrode 116 as electrode 125 is below electrode 117. Electrodes 123 and 125 are connected to the surface indicating equipment by respective flexible conductors 128 and 129 which correspond to respective conductors 93 and 94 of Figure 4. A motor 130, which corresponds to motor 67 of Figure 4, is attached to frame 115 near the upper end thereof and is coupled to sprocket wheel 120 by bevel gears 132 and 133 such that rotation of motor 130 results in corresponding movement of sprocket wheel 120 in either a clockwise or counterclockwise direction depending upon the direction of rotation of motor 130.

The apparatus of Figure 6 operates in substantially the same manner as the apparatus of Figure 4. The surface equipment indicated in Figure 3 is connected to the bore hole equipment in like manner. Rotation of sprocket wheel 120 in a clockwise direction results in electrodes 123 and 125 each being moved inwardly toward respective electrodes 116 and 117. Counterclockwise rotation of sprocket wheel 120 results in electrodes 123 and 125 being moved outwardly from respective electrodes 116 and 117. Insulating disc 118 is of sufficient diameter to direct a large portion of the current flow between electrodes 116 and 117 through the surrounding earth formations rather than through the drilling mud surrounding the assembly. Disc 118 is provided with suitable openings to allow chain 122 to pass therethrough.

Figure 7:
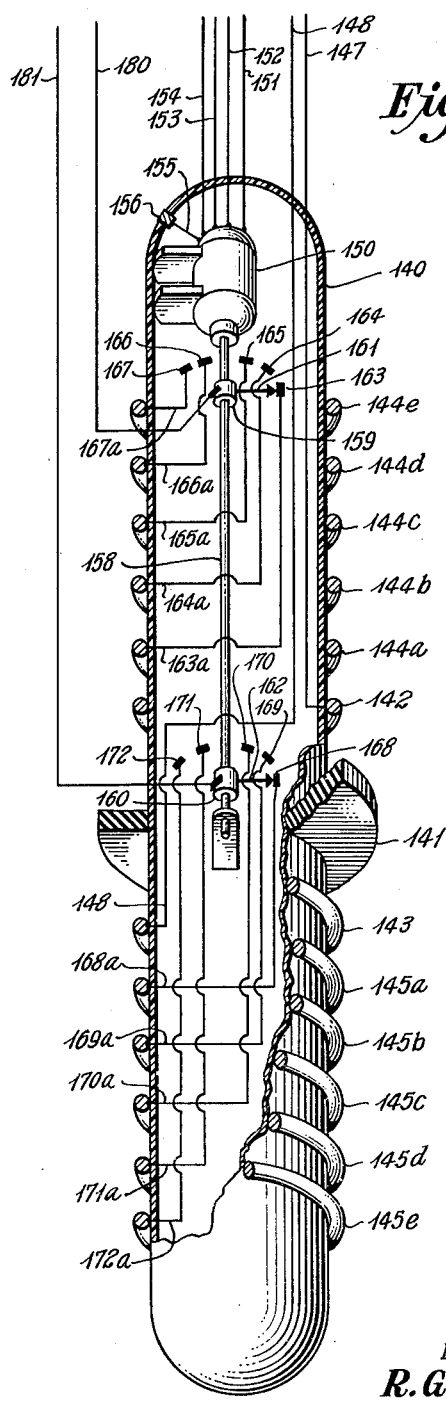
Figure 7 illustrates a third embodiment of the electrode assembly.

In Figure 7 there is illustrated a third embodiment of logging apparatus which also is operated by the surface equipment illustrated in Figure 3. The apparatus of Figure 7 comprises a housing assembly in the form of an elongated hollow casing 140 which is constructed of electrically insulating material. An insulating disc 141 is attached to casing 140 near the midpoint thereof and extends outwardly from casing 140 into close proximity to the walls of the bore hole. A first annular electrode 142, which corresponds to electrode 70 of Figure 4, is mounted on casing 140 at a point above disc 141; and a second annular electrode 143, which corresponds to electrode 71 of Figure 4, is mounted on casing 140 below disc 141. A series of equally spaced electrodes 144a, 144b, 144c, 144d and 144e is mounted on the upper portion of casing 140 and a corresponding series of equally spaced electrodes 145a, 145b, 145c, 145d and 145e is mounted on the lower portion of casing 140. These two series of electrodes are positioned such that electrode 144a is the same distance from electrode 142 as electrode 145a is from electrode 143. In like manner each of the remaining 144 electrodes are positioned the same distance above electrode 142 as the corresponding 145 electrodes are positioned below electrode 143. Electrical conductors 147 and 148, which correspond to respective conductors 74 and 75 of Figure 4, are connected to respective electrodes 142 and 143. A motor 150, which corresponds to motor 167 of Figure 4, is mounted within casing 140 and is connected by leads 151, 152, 153 and 154 to the surface equipment. A lead 155 is connected between motor 150 and a terminal 156 which is in contact with the drilling mud, terminal 156 serving as the grounded return path to voltage source 108 of Figure 3. The drive shaft 158 of motor 150 has a pair of cylindrical commutators 159 and 160 mounted thereon. These commutators are constructed of electrically insulating material, but are supplied with an outer metallic coating. A first switch arm 161 is attached to commutator 159 and a second switch arm 162 is attached to commutator 160. Switch arm 161 is adapted to engage terminals 163, 164, 165, 166 and 167 in succession as arm 161 is rotated by motor 150. In like manner switch arm 162 is adapted to engage terminals 168, 169, 170, 171 and 172 in succession at respective corresponding time intervals when arm 162 is rotated by motor 150. Terminals 163, 164, 165, 166 and 167 are connected to respective electrodes 144a, 144b, 144c, 144d and 144e by respective leads 163a, 164a, 165a, 166a, and 167a. In like manner terminals 168, 169, 170, 171 and 172 are connected to respective electrodes 145a, 145b, 145c, 145d and 145e by respective leads 168a, 169a, 170a, 171a and 172a. Conductors 180 and 181, which correspond to respective conductors 93 and 94 of Figure 4, are connected at their lower ends to make contact continuously with respective switch arms 161 and 162.

The apparatus of Figure 7 is operated by rotating motor 150 such that switch arm 161 engages terminals 163, 164, 165, 166 and 167 successively. At the corresponding times switch arm 162 engages respective terminals 168, 169, 170, 171 and 172. This switching arrangement effectively moves the pick-up electrodes 144 outwardly from electrode 142 and the pick-up electrodes 145 outwardly from electrode 143. This movement is accomplished since adjacent pick-up electrodes are connected to recorder 97 in succession. Rotation of motor 150 in the opposite direction reverses the switching operation such that the pick-up electrodes are effectively moved inwardly.

From the foregoing description it should be apparent that there is provided in accordance with the present invention an improved method of and apparatus for electrical well logging. This system is particularly valuable in determining the lateral depth of electrical discontinuities in earth formation surrounding bore holes. While this invention has been described in conjunction with present preferred embodiments thereof it is to be understood that the invention is not limited thereto.

We claim:

1. The method of electrical well logging which comprises lowering a first electrode to a first predetermined depth in a well, lowering a second electrode to a second predetermined depth in the well so that said first and second electrodes are in substantially vertically spaced alignment, said first depth being greater than said second depth, lowering a third electrode to a third predetermined depth in the well, said third depth being greater than said first depth, lowering a fourth electrode to a fourth predetermined depth in the well, said fourth depth being substantially as much less than said second depth as said third depth is greater than said first depth, applying an electrical potential between said first and second electrodes, moving said third and fourth electrodes simultaneously in substantially vertical directions through the well while retaining said first and second electrodes stationary so that the spacing between said first and third electrodes remains substantially equal to the spacing between said second and fourth electrodes, and measuring the potential difference between said third and fourth electrodes.

2. The method in accordance with claim 1 further comprising measuring the potential at each of said third and fourth electrodes with respect to a point of reference potential.

3. The method of determining lateral discontinuities in earth formations surrounding a bore hole which comprises lowering a first electrode to a first predetermined depth in a bore hole, lowering a second electrode to a second predetermined depth in the bore hole so that said first and second electrodes are in substantially vertically spaced alignment with said first electrode being positioned below said second electrode, lowering a third electrode to a third predetermined depth in the bore hole, said third depth being greater than said first depth, lowering a fourth electrode to a fourth predetermined depth in the bore hole, said fourth depth being substantially as much less than said second depth as said third depth is greater than said first depth, applying an electrical potential between said first and second electrodes, moving said third and fourth electrodes simultaneously in substantially vertical directions through the bore hole so that the spacing between said first and third electrodes remains substantially equal to the spacing between said second and fourth electrodes, retaining said first and second electrodes stationary, continuously measuring the potential difference between said third and fourth electrodes while said third and fourth electrodes are moved, and measuring the spacing between said third and fourth electrodes as a function of said measured potential between said third and fourth electrodes.

4. The method of electrical well logging which comprises lowering a first electrode to a first predetermined depth in a well, lowering a second electrode to a second predetermined depth in the well so that said first and second electrodes are in substantially vertically spaced alignment, said first depth being greater than said second depth, lowering a third electrode to a third predetermined depth in the well, said third depth being greater than said first depth, lowering a fourth electrode to a fourth predetermined depth in the well, said fourth depth being substantially as much less than said second depth as said third depth is greater than said first depth, applying an electrical potential between said first and second electrodes, moving said third and fourth electrodes simultaneously in substantially vertical directions through the well so that the spacing between said first and third electrodes remains substantially equal to the spacing between said second and fourth electrodes, and measuring the potential at each of said third and fourth electrodes with respect to a point of reference potential while said third and fourth electrodes are moved.

5. Electrical well logging apparatus comprising, in combination, an elongated housing assembly adapted to be lowered into a bore hole, first and second current electrodes mounted on said assembly so as to be insulated therefrom and in spaced relation with one another so that said first and second current current electrodes are in substantially vertical alignment when said assembly is positioned in a bore hole, first and second potential pick-up electrodes mounted on said assembly so as to be insulated therefrom and in spaced relation with one another so that said first and second current electrodes are positioned between said first and second pick-up electrodes, and means for varying the effective spacings of said pick-up electrodes with regard to said current electrodes so that the spacing between said first current electrode and said first pick-up electrode remains substantially equal to the spacing between said second current electrode and said second pick-up electrode.

6. The combination in accordance with claim 5 further comprising means for connecting a source of current between said first and second current electrodes whereby current flows between said first and second current electrodes when said assembly is positioned within a bore hole, and means for measuring the potential difference between said first and second pick-up electrodes, all of said electrodes being in electrical contact with fluid in the bore hole.

7. The combination in accordance with claim 5 further comprising means for connecting a source of current between said first and second current electrodes whereby current flows between said first and second electrodes when said assembly is positioned within a bore hole, and means for measuring the potential at said first pick-up electrode with respect to a point of reference potential, and means for measuring the potential at said second pick-up electrode with respect to said point of reference potential.

8. Electrical well logging apparatus comprising, in combination, an elongated housing assembly, means for lowering said assembly into a bore hole to known depths, first and second current electrodes mounted on said assembly so as to be insulated therefrom and in spaced relation with one another so that said first and second electrodes are in substantially vertical alignment when said assembly is lowered into a bore hole, means for connecting a source of current between said first and second current electrodes, a body of electrically insulating material mounted on said assembly between said first and second current electrodes, said body extending outwardly from said assembly into closely spaced relation with the walls of the bore hole whereby current flow between said first and second current electrodes is directed through the surrounding earth formations, first and second potential pick-up electrodes mounted on said assembly so as to be insulated therefrom and in spaced relation so that said first and second current electrodes are positioned between said first and second pick-up electrodes, means for measuring the potentials at said first and second pick-up electrodes, means for varying the effective spacings of said first and second pick-up electrodes with respect to said first and second current electrodes so that the spacing between said first current electrode and first pick-up electrode remains substantially equal to the spacing between said second current electrode and said second pick-up electrode, and means for measuring the spacings between said first pick-up electrode and said second pick-up electrode.

9. Electrical well logging apparatus comprising, in combination, an elongated housing assembly, means for lowering said assembly into a bore hole to known depths, first and second current electrodes mounted on said assembly so as to be insulated therefrom and in spaced relation with one another so that said first and second electrodes are in substantially vertical alignment when said assembly is lowered into a bore hole, means for connecting a source of current between said first and second current electrodes, a body of electrically insulating material mounted on said assembly between said first and second current electrodes, said body extending outwardly from said assembly into closely spaced relation with the walls of the bore hole whereby current flow between said first and second current electrodes is directed through the surrounding earth formations, first and second potential pick-up electrodes mounted on said assembly so as to be insulated therefrom and in spaced relation so that said first and second current electrodes are positioned between said first and second pick-up electrodes, means for measuring the potential difference between said first and second pick-up electrodes, means for varying the effective spacings of said first and second pick-up electrodes with respect to said first and second current electrodes whereby the spacing between said first current electrode and first pick-up electrode remains substantially equal to the spacing between said second current electrode and said second pick-up electrode, and means for measuring the spacings between said first pick-up electrode and said second pick-up electrode.

10. Electrical well logging apparatus comprising, in combination, an elongated housing assembly adapted to be lowered into a bore hole, first and second current electrodes mounted on said housing so as to be insulated therefrom and in spaced relation with one another near the midpoint of said housing such that said first and second electrodes are in substantially vertical alignment when said assembly is lowered into a bore hole, first and second potential pick-up electrodes mounted on said housing so as to be insulated therefrom and, a motor secured to said housing, and means connecting said first and second pick-up electrodes to said motor whereby rotation of said motor in a first direction results in said first and second pick-up electrodes being moved outwardly from said first and second current electrodes and whereby rotation of said motor in a second direction results in said first and second pick-up electrodes being moved inwardly with respect to said first and second current electrodes, the distance between said first current electrode and said first pick-up electrode remaining substantially equal to the distance between said second current electrode and said second pick-up electrode at all times.

11. Electrical well logging apparatus comprising, in combination, an elongated housing assembly adapted to be lowered into a bore hole, first and second current electrodes mounted on said housing near the midpoint thereof so as to be insulated from said housing and in spaced relation with one another so that said first and second current electrodes are in substantially vertical alignment when said assembly is positioned within a bore hole, an electric motor secured to said housing assembly, first and second potential pick-up electrodes mounted on the drive shaft of said motor so as to be insulated therefrom and in spaced relation with one another such that first and second current electrodes are positioned between said first and second pick-up electrodes, said first and second pick-up electrodes being mounted on the drive shaft of said motor so that rotation of said motor in a first direction results in movement of said first and second pick-up electrodes simultaneously outwardly from said first and second current electrodes and rotation of said motor in a second direction results in movement of said first and second pick-up electrodes simultaneously inwardly toward said first and second current electrodes, the distance between said first current electrode and said first pick-up electrode remaining substantially equal to the distance between said second current electrode and said second pick-up electrode at all times, and an annular body of electrically insulating material mounted on said housing assembly between said first and second current electrodes, said annular body extending outwardly from said housing into close proximity to the walls of the bore hole.

12. Electrical well logging apparatus comprising, in combination, an elongated housing assembly adapted to be lowered into a bore hole, first and second current electrodes mounted on said housing near the midpoint thereof so as to be insulated from said housing and in spaced relation with one another so that said first and second current electrodes are in substantially vertical alignment when said assembly is positioned within a bore hole, a first pulley secured to said housing assembly near one end thereof, a second pulley secured to said housing assembly near the other end thereof, a flexible member encircling said first and second pulleys, first and second potential pick-up electrodes mounted on said flexible member so as to be insulated therefrom and in spaced relation, and means for rotating said first pulley, said first and second pick-up electrodes being moved inwardly toward said current electrodes when said first pulley is rotated a first direction and said first and second pick-up electrodes being moved outwardly from said current electrodes when said first pulley is rotated a second direction, the distance between said first current electrode and said first pick-up electrode being substantially equal to the distance between said second current electrode and said second pick-up electrode at all times.

13. The combination in accordance with claim 12 further comprising a current source connected between said current electrodes and means to measure the potentials at said pick-up electrodes.

14. Electrical well logging apparatus comprising, in combination, an elongated housing assembly adapted to be lowered into a bore hole, first and second current electrodes mounted on said housing near the midpoint thereof so as to be insulated from said housing and in spaced relation with one another so that said first and second current electrodes are in substantially vertical alignment when said assembly is positioned within a bore hole, a first sprocket wheel secured to said housing assembly near one end thereof, a second sprocket wheel secured to said housing assembly near the other end thereof, a chain encircling said first and second wheels, a motor secured to said housing assembly to rotate said first wheel, first and second potential pick-up electrodes insulatedly mounted on said chain in spaced relation, said first and second pick-up electrodes being moved inwardly toward said current electrodes when said first wheel is rotated a first direction and said first and second pick-up electrodes being moved outwardly from said current electrodes when said first wheel is rotated a second direction, the distance between said first current electrode and said first pick-up electrode being substantially equal to the distance between said second current electrode and said second pick-up electrode at all times, and an annular body of electrically insulating material mounted on said housing assembly between said first and second current electrodes, said annular body extending outwardly from said housing into close proximity to the walls of the bore hole.

15. Electrical well logging apparatus comprising, in combination, an elongated housing assembly adapted to be lowered into a bore hole, first and second current electrodes mounted on said housing near the midpoint thereof so as to be insulated from said housing and in spaced relation with one another so that said first and second current electrodes are in substantially vertical alignment when said assembly is positioned within a bore hole, a plurality of first potential pick-up electrodes mounted on said housing so as to be insulated therefrom and in spaced relation with one another, said first pick-up electrodes being positioned between said first current electrode and one end of said housing assembly, a plurality of second potential pick-up electrodes mounted on said housing in spaced relation with one another, said second pick-up electrodes being positioned between said second current electrode and the second end of said housing, first and second electrical terminals, and switching means to connect said first pick-up electrodes to said first terminal in succession and to connect said second pick-up electrodes to said second terminal in succession whereby the spacing between said first current electrode and the first pick-up electrode connected to said first terminal remains substantially equal to the spacing between said second current electrode and the second pick-up electrode connected to said second terminal.

16. The combination in accordance with claim 15 further comprising a current source connected between said current electrodes and means to measure the potentials at said terminals.

17. Electrical well logging apparatus comprising, in combination, an elongated housing assembly adapted to be lowered into a bore hole, first and second current electrodes mounted on said housing near the midpoint thereof so as to be insulated from said housing and in spaced relation with one another so that said first and second current electrodes are in substantially vertical alignment when said assembly is positioned within a bore hole, a plurality of first potential pick-up electrodes mounted on said housing so as to be insulated therefrom and in spaced relation with one another, said first pick-up electrodes being positioned between said first current electrodes and one end of said housing assembly, a plurality of second potential pick-up electrodes mounted on said housing in spaced relation with one another, said second pick-up electrodes being positioned between said second current electrode and the second end of said housing, a motor secured to said housing, first and second switch arm insulatedly mounted on the drive shaft of said motor, a plurality of first electrical contacts associated with said first switch arm so that said first switch arm engages said first contacts in succession when rotated by said motor, said first electrical contacts being connected to respective ones of said first pick-up electrodes, a plurality of second electrical contacts associated with said second switch arm so that said second switch arm engages said second contacts in succession when rotated by said motor, said second electrical contacts being connected to respective ones of said second pick-up electrodes, said first and second contacts being positioned so that the spacing between said first current electrode and the first pick-up electrode connected to said first switch arm remains substantially equal to the spacing between said second current electrode and the second pick-up electrode connected to said second switch arm, and an annular body of electrically insulating material mounted on said housing assembly between said first and second current electrodes, said annular body extending outwardly from said housing into close proximity to the walls of the bore hole.

References Cited in the file of this patent

UNITED STATES PATENTS

| | | |
|---|---|---|
| 2,117,390 | Zuschlag | May 17, 1938 |
| 2,133,786 | Neufield | Oct. 18, 1938 |
| 2,268,137 | Evjen | Dec. 30, 1944 |
| 2,393,009 | Chun | Jan. 15, 1946 |
| 2,404,622 | Doan | July 23, 1946 |
| 2,654,064 | Broding | Sept. 29, 1953 |
| 2,655,632 | Murphree | Oct. 13, 1953 |
| 2,730,672 | Mounce | Jan. 10, 1956 |
| 2,779,912 | Waters | Jan. 29, 1957 |